United States Patent [19]

Lee

[11] Patent Number: 5,094,330
[45] Date of Patent: Mar. 10, 1992

[54] POWER TRANSMISSION MECHANISM WITH AUTOMATIC CLUTCH MEANS

[76] Inventor: Song-Ming Lee, 69, Fukuang 4th Lane, Wukuang Road, Kuangming vil., Wujih Hsiang, Taichung, Taiwan

[21] Appl. No.: 732,827

[22] Filed: Jul. 19, 1991

[51] Int. Cl.⁵ .............................................. F16D 7/02
[52] U.S. Cl. ................................. 192/56 R; 464/39; 81/475
[58] Field of Search ................. 192/56 R; 464/39; 81/475

[56] References Cited

U.S. PATENT DOCUMENTS

| | | | |
|---|---|---|---|
| 363,635 | 5/1987 | Henrichsen | 464/39 |
| 1,169,193 | 1/1916 | Ramelli | 464/39 |
| 1,828,370 | 10/1931 | Huddle | 464/39 |
| 1,835,135 | 12/1931 | Bertrand | 81/475 |
| 2,390,908 | 12/1945 | Young | 464/39 |
| 2,725,770 | 12/1955 | Short et al. | 81/475 |
| 2,733,622 | 2/1956 | Evans | 464/39 X |
| 3,752,278 | 8/1973 | States | 464/39 X |
| 4,768,634 | 9/1988 | Quick et al. | 192/56 R |
| 4,913,242 | 4/1990 | Lo | 192/56 X |

*Primary Examiner*—Leslie A. Braun
*Assistant Examiner*—Nicholas Whitelaw
*Attorney, Agent, or Firm*—Ladas & Parry

[57] ABSTRACT

A power transmission mechanism for a motorized hand tool, comprising a socket, a first spring set in said socket, a first rotary member inserted in said socket and stopped against said first spring, a revolving shaft inserted through said first rotary member, said first spring and said socket and connected to a power unit, a second rotary member inserted in said first rotary member, a cap attached to said first rotary member at an opposite end, and a second spring retained between said second rotary member and said cap, wherein said gap and said first rotary member are forced to move backwards toward said socket, when the resisting force which acts onto said tool surpasses the driving force from said revolving shaft, causing said second rotary member to disconnect from said first rotary member and said revolving shaft.

1 Claim, 3 Drawing Sheets

POWER TRANSMISSION MECHANISM WITH AUTOMATIC CLUTCH MEANS

BACKGROUND OF THE INVENTION

The present invention relates to power transmission mechanisms and relates more particularly to a power transmission mechanism for a motorized hand tool which has a clutch means which automatically disconnects the tool from the driving shaft thereof when the tool bears a resisting force which surpasses the driving force from the driving shaft.

In regular motorized hand tools, a tool (which may be a bit, drill or blade) is generally attached to a power transmission mechanism and driven to rotate on a workpiece for processing. The power transmission mechanism is continuously transmitting kinetic energy from a driving motor to the bit causing it to rotate. Because there is no clutch means set in the power transmission mechanism, the tool may be damaged easily when it bears a resisting force from a workpiece which surpasses the driving force from the transmission mechanism.

SUMMARY OF THE INVENTION

The present invention has been accomplished to eliminate the aforesaid problem. It is therefore the main object of the present invention to provide a power transmission mechanism for a motorized hand tool or the like which has a clutch means which automatically disconnects the tool from the driving shaft thereof when the tool bears a resisting force which surpasses the driving force from the driving shaft.

To achieve this object, there is provided a power transmission mechanism which is generally comprised of a socket, a first spring set in said socket, a first rotary member inserted in said socket and stopped against said first spring, a revolving shaft inserted through said first rotary member, said first spring and said socket and connected to a power unit, a second rotary member inserted in said first rotary member, a cap attached to said first rotary member at an opposite end, and a second spring retained between said second rotary member and said cap. Rotating the revolving shaft causes the first rotary member to drive the tool to rotate via the second rotary member. The cap and the first rotary member are forced to move backwards toward the socket, when the resisting force which acts onto the tool surpasses the driving force from the revolving shaft, causing the second rotary member to disconnect from the first rotary member and the revolving shaft.

DETAILED DESCRIPTION OF THE PREFERRED EMBODIMENT

Figure 1:
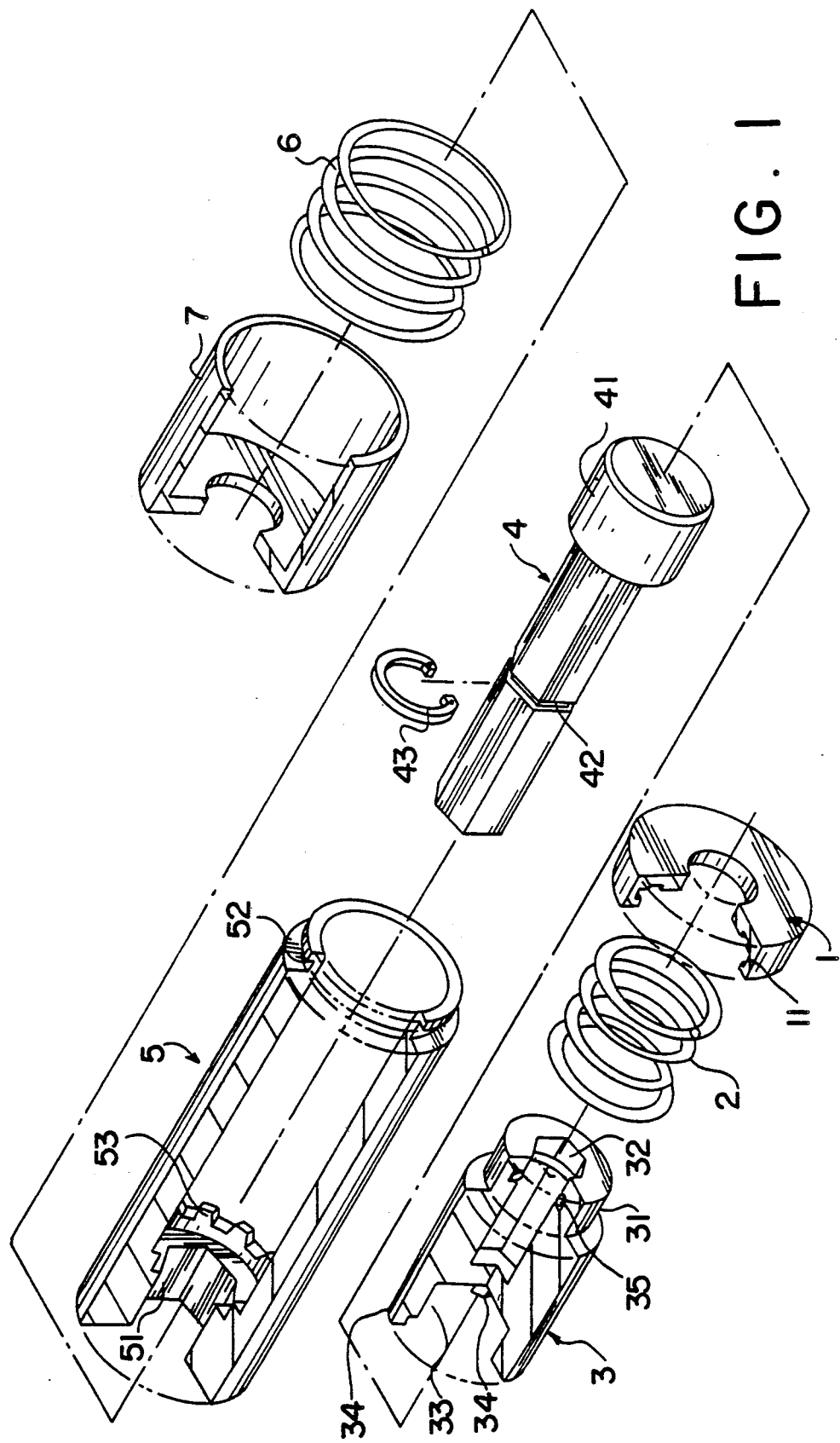
FIG. 1 is an exploded perspective view of the preferred embodiment of the power transmission mechanism of the present invention.
Figure 2:
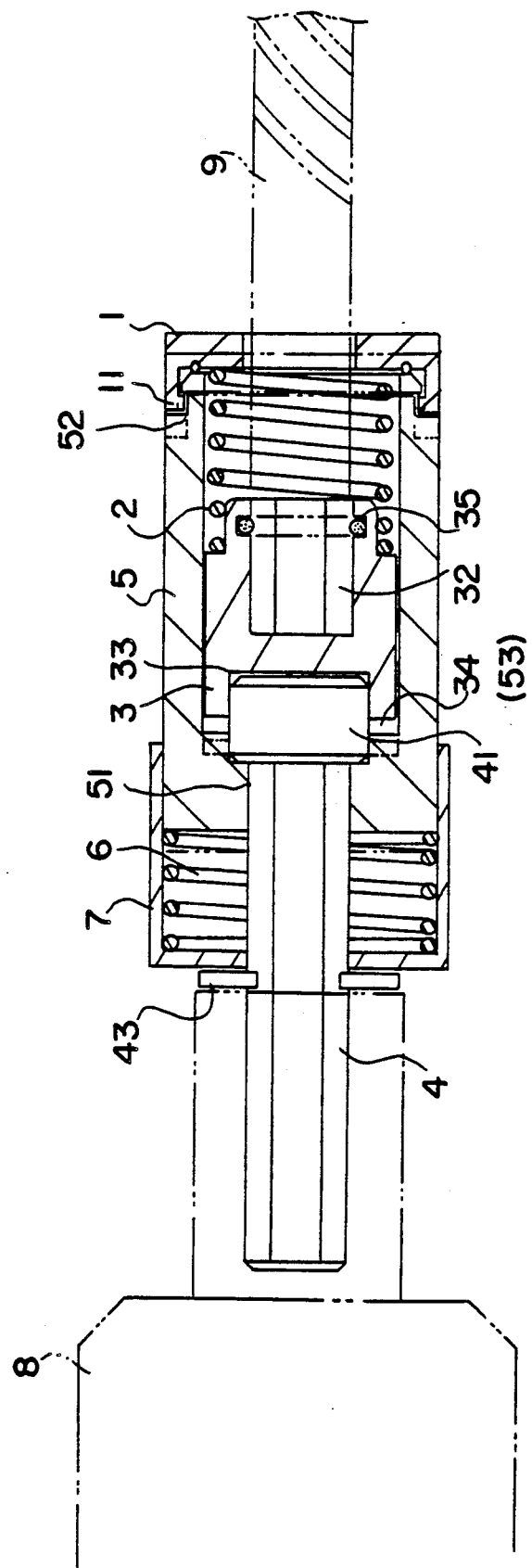
FIG. 2 is a sectional view in longitudinal direction showing the operation of the present invention.
Figure 3A:
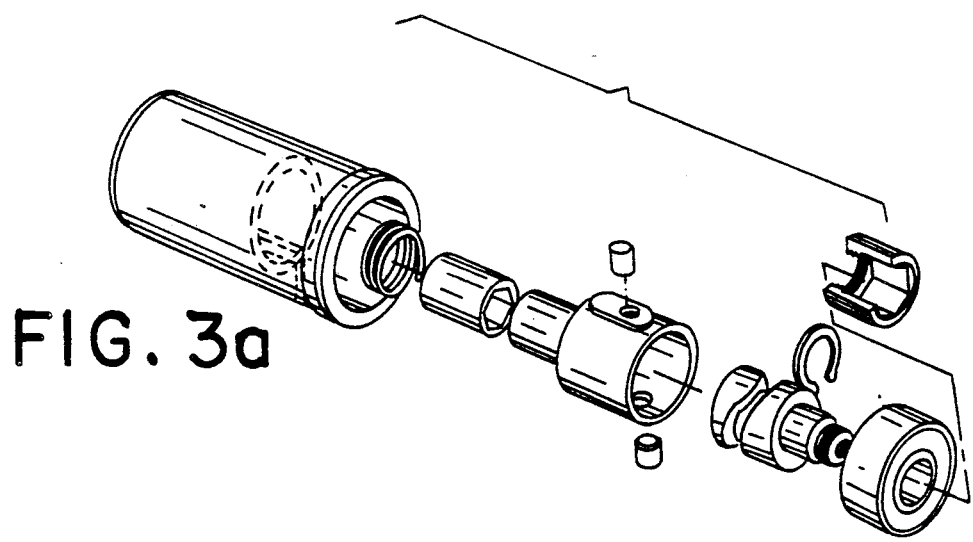
FIGS. 3a, 3b, 3c and 3d illustrate a power transmission mechanism for a motorized hand tool as constructed according to the prior art.
Figure 3B:
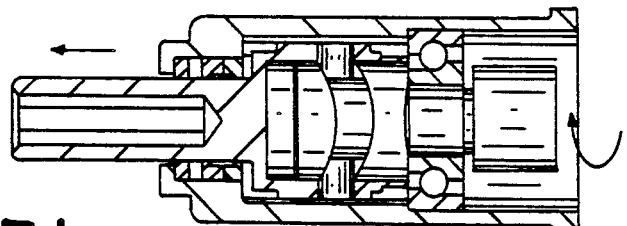
Figure 3C:
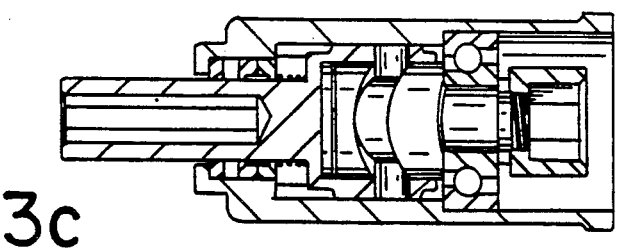
Figure 3D:
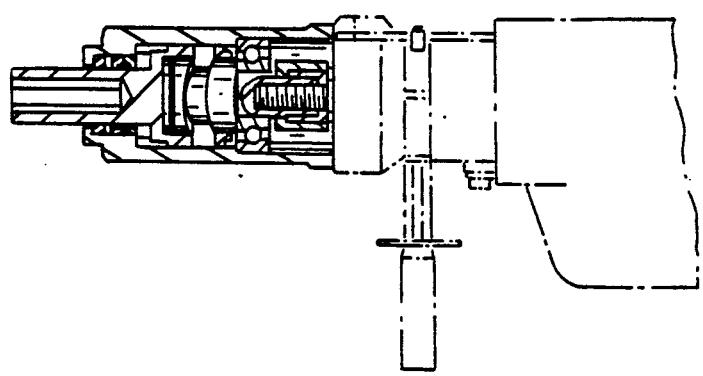

Referring to FIGS. 1 and 2, therein illustrates is the preferred embodiment of the power transmission mechanism of the present invention which is generally comprised of a socket 7, a first spring 6 set in said socket 7, a first rotary member 5 inserted in said socket and stopped against said first spring 6, a revolving shaft 4 inserted through said first rotary member 5 said first spring 6 and said socket 7, a second rotary member 3 inserted in said first rotary member 5 to hold said revolving shaft 4 in said first rotary member 5, a cap 1 attached to said first rotary member 5 at an opposite end (opposite to said socket 7), and a second spring 2 retained between said second rotary member 3 and said cap 1.

Referring to FIG. 1 again, the first rotary member 5 is made from a tube, having a polygonal flange 51 raising from the inner wall surface thereof at one end, a toothed portion 53 around the inner wall surface thereof adjacent to said polygonal flange 51, and an annular groove 52 around the outer wall surface thereof at an opposite end. The revolving shaft 4 has an expanded head portion 41 at one end and a groove 42 around the outer wall surface thereof at the middle. Once the revolving shaft 4 is inserted through the first rotary member 5, the first spring 6 and the socket 7, the expanded head portion 41 of the revolving shaft 4 is stopped against the polygonal flange 51 inside the boring bore of the first rotary member, and the groove 42 of the revolving shaft 4 is disposed out of the socket 7. By fastening a snap ring 43 on the groove 42, the revolving shaft 4 is retained in the first rotary member 5. The second rotary member 3 has a boring bore 33 through the axis thereof, a toothed portion 34 at one end around the periphery thereof releasably engaged with the toothed portion 53 on said first rotary member 5, a circular projection 31 longitudinally disposed at an opposite end, which circular projection 31 defines therein a polygonal hole 32 longitudinally aligned with said boring bore 33, which polygonal hole 32 has a retainer ring 35 fastened therein. After the second rotary member 3 has been inserted in the first rotary member 5 with its toothed portion 34 engaged with the toothed portion 53 on the first rotary member 5, the second spring is mounted on the circular projection 31 and retained in the first rotary member 5 by the cap 1. The cap 1 has a flange 11 at one end engaged in the groove 52 on the first rotary member 5 to secure the second spring 2, the second rotary member 3 and the revolving shaft 4 inside the first rotary member 5.

Referring to FIG. 2 again, after a tool 9 (bit, drill or the like) has been inserted through the cap 1, the second spring 2 into the polygonal hole 32 on the circular projection 31 of the second rotary member 3 and retained in place by the retainer ring 35, the revolving shaft 4 is then connected to a power unit 8. When power is on, the revolving shaft 4 is driven by the power unit 8 to carry the first rotary member 5 to rotate. Rotating the first rotary member 5 causes the second rotary member 3 to carry the tool 9 to rotate. When the tool 9 is stuck on a workpiece during its operation, the cap 1 and the first rotary member 5 will be forced by the resisting force which acts onto the tool 9, to move backwards toward the socket 7, causing the toothed portion 53 of the first rotary member 5 to disconnect from the toothed portion 34 of the second rotary member 3, and therefore, the first rotary member 5 will become in an idle mode. When the first rotary member 5 is running idly, the second rotary member 3 and the tool 9 are stopped from rotary motion. Therefore, the tool 9 will not be damaged when it encounters a big resisting force which surpasses the driving power from the second rotary member 3. When working condition returns to normal, the spring force from the first and second springs 6 and 2 automatically forces the toothed portion 34 of the second rotary member 3 to engage with the toothed portion 53 of the first rotary member 5.

What is claimed is:

1. A power transmission mechanism comprising:

a first rotary member having a boring bore through the axis thereof, a polygonal flange raising from the inner wall surface thereof at one end, a toothed portion raising around the inner wall surface thereof adjacent to said polygonal flange and disposed in longitudinal direction, and an annular groove around the outer wall surface thereof at an opposite end;

a socket mounted on said first rotary member over said polygonal flange;

a first spring retained in said socket between said first rotary member;

a revolving shaft inserted through said first rotary member and connected to a power unit, said first spring and said socket, said revolving shaft having an expanded head portion at one end set inside said first rotary member and stopped against said polygonal flange, a groove around the outer wall surface thereof and retained by a snap retainer outside said socket;

a second rotary member having a boring bore through the axis thereof, a toothed portion at one end around the periphery thereof releasably engaged with the toothed portion on said first rotary member, and a circular projection at an opposite end, said circular projection defining therein a polygonal hole for fastening a tool retained in place by a retainer ring;

a cap having a flange at one end engaged in said annular groove on said first rotary member and a through-hole through the axis thereof for the passing therethrough of said tool;

a second spring mounted on said circular projection and retained between said cap;

wherein rotating said revolving shaft causes said first rotary member to drive said tool to rotate via said second rotary member; and wherein said cap and said first rotary member are forced to move backwards toward said socket, when the resisting force which acts onto said tool surpasses the driving force from said revolving shaft, causing said second rotary member to disconnect from said first rotary member and said revolving shaft.

* * * * *